(12) United States Patent
Menolotto et al.

(10) Patent No.: US 6,319,073 B1
(45) Date of Patent: Nov. 20, 2001

(54) HYBRID SUBMARINE STREAMER CONNECTOR

(75) Inventors: Paolo Menolotto, Mount Eliza; Anh Ngoc Nguyen, West Footscray, both of (AU)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 09/464,440

(22) Filed: Dec. 16, 1999

(51) Int. Cl.[7] .................................................. H01R 13/428
(52) U.S. Cl. ............................................................. 439/744
(58) Field of Search .................................... 439/744, 598, 439/599, 589, 595, 871

(56) References Cited

U.S. PATENT DOCUMENTS

| | | |
|---|---|---|
| 2,419,018 | 4/1947 | Gudie . |
| 2,999,221 | 9/1961 | Ellis et al. . |
| 3,158,424 | 11/1964 | Bowen . |
| 3,221,292 | 11/1965 | Swanson et al. . |
| 3,246,281 | 4/1966 | Cunningham . |
| 3,335,396 | 8/1967 | Nava et al. . |
| 3,475,720 | 10/1969 | Culver . |
| 3,500,298 | 3/1970 | Williamson . |
| 3,697,935 | 10/1972 | Drapkin . |
| 3,721,943 | 3/1973 | Curr . |
| 3,752,506 * | 8/1973 | Fouts ..................................... 285/149 |
| 3,947,182 | 3/1976 | McCartney . |
| 4,010,993 | 3/1977 | Hohenberger et al. . |
| 4,229,064 * | 10/1980 | Vetter et al. ..................... 339/186 M |
| 4,421,378 | 12/1983 | Sanford et al. . |
| 4,776,816 | 10/1988 | Herscovici et al. . |
| 4,804,243 * | 2/1989 | Borsuk et al. ....................... 350/96.2 |
| 5,295,866 * | 3/1994 | Kroger et al. ....................... 439/589 |
| 5,510,577 * | 4/1996 | Corrigan ............................ 174/74 R |
| 5,538,445 * | 7/1996 | Grzybowski et al. ............... 439/752 |
| 5,575,691 | 11/1996 | Matthews . |
| 5,934,945 | 8/1999 | Petersen et al. . |

OTHER PUBLICATIONS

IBM Technical Disclosure Bulletin, vol. 4, No. 6 Nov. 1961, "Contact Pin Removal Tool", J. E. Pfaff and E. J. Renda.
Aviation Week Sep. 17, 1962, p. 13, Cannon's "Little Caeser" Rear Release System.
1 Encyclopedia of Connectors, pp. 8–11 (Edwards Publishing Co. 1976).

* cited by examiner

Primary Examiner—Gary Paumen
Assistant Examiner—Phuongchi Nguyen
(74) Attorney, Agent, or Firm—Blank, Rome, Comisky & McCauley, LLP

(57) ABSTRACT

An insert assembly for a hybrid marine connector including a front disk, a rear disk abutting the front insulator disk, a hole extending through the front and rear insulator disks, the hole having a shoulder formed in each of the disks, a collet clip positioned between the shoulders in the hole for releasably retaining a contact in the hole, and a bolt for axially compressing the front disk into abutment with the rear disk.

15 Claims, 4 Drawing Sheets

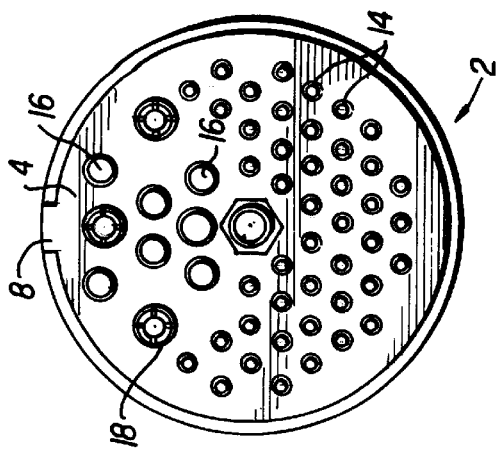
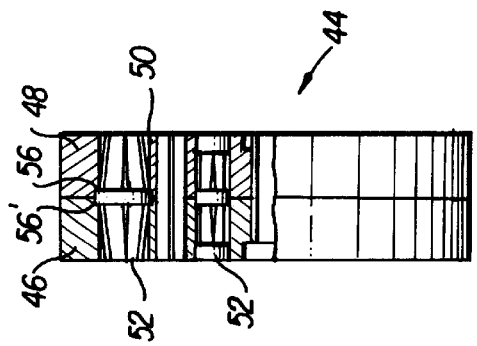
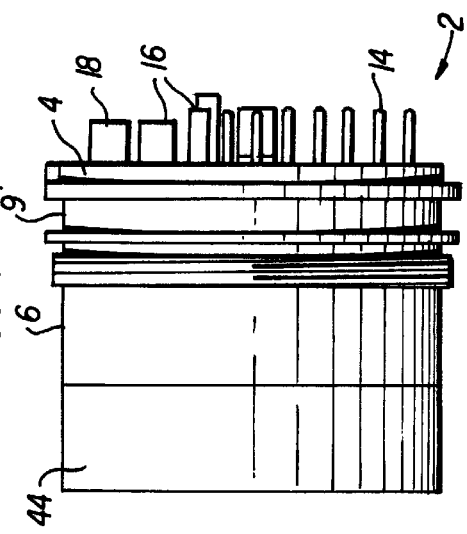
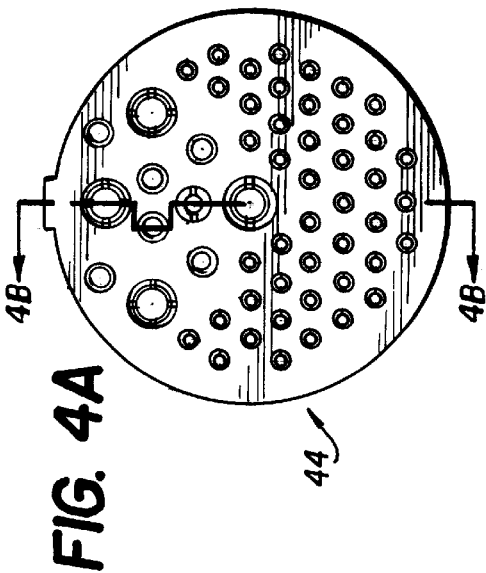
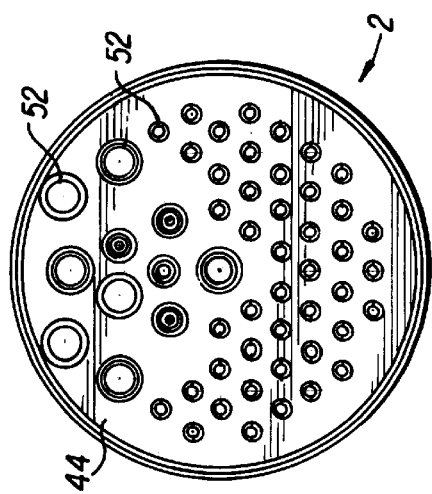

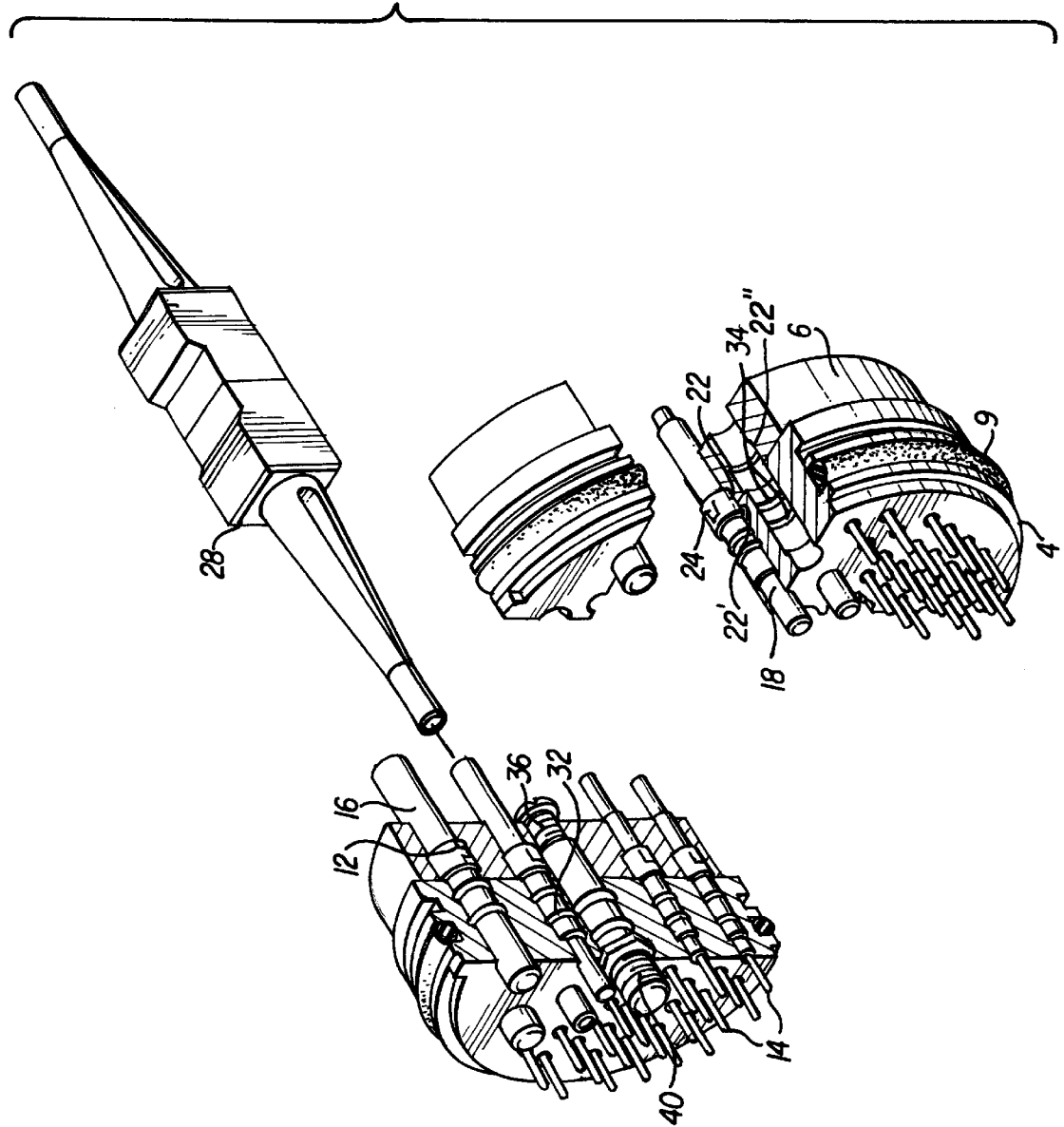

HYBRID SUBMARINE STREAMER CONNECTOR

BACKGROUND OF THE INVENTION

1. Field of the Invention

The present invention generally relates to a hybrid electrical and fiber optic connector for a submarine streamer, and, more particularly, to a connector with contacts secured to insulation by a resiliently biased part latching behind a shoulder or into a recess.

2. Description of Related Art

Reflection seismology is one of the most important tools available to petroleum geophysicists for surveying subsurface geologic formations in connection with petroleum exploration. During a typical seismic prospecting survey, energy in the form of an impulse, explosion, or continuous vibration is introduced into the ground near the surface of the earth. The energy waves spread in all directions from the source and are partially reflected by underground structural discontinuities, such as the interfaces between different types of rock. Sensors, called geophones, detect these reflected waves as small displacements of the earth's surface which are then converted into electrical signals that can be recorded, processed, and further analyzed. For example, the time required for the reflected energy to return to the surface at a particular location can be used to determine the depth of the rock interfaces at that location. By plotting this return time for an array of such geophones at various locations along the surface, geophysicists can then assemble a picture of the subsurface rock layers at various depths.

For marine seismic prospecting, hydrophones are used to record the excess pressure generated by reflected sound waves in the water along a profile line being surveyed. The hydrophones are part of a cable, called a submarine streamer, that typically includes a strength member surrounded by numerous electrical conductors or optical fibers for transmitting signals from the hydrophones to a recording device on a tow ship. A single ship moving at 4–6 knots might pull a 10,000 foot long streamer cable having twenty-four or more sections, or stations, joined by connectors. Each streamer station will include ten to forty hydrophones for sensing the reflected energy waves from an explosive gas source, or continuous bubble source, near the ship which is activated over roughly ten to thirty-second intervals. In this manner, a typical seismic survey ship can thus survey about 50 miles of line each day.

Each section of the streamer may include forty, or more, signal transmission lines terminating at male and female connectors on the ends of that section of the streamer. In order to provide accurate information, each of the sections is preferably towed at constant depth, typically thirty-five to forty feet below the surface of the water. However, the streamer can also be exposed to much greater depths. The streamer sections are therefore enclosed in a flexible, plastic sheath which not only provides protection against abrasion and corrosion due to infiltration of salt water, but also allows the streamer to be buoyancy balanced along its length. This balancing is typically accomplished by filling the sheath with a liquid that floats on water (usually a buoyant, kerosene-like liquid such as noroma) and/or by adding lead tape to the exterior of the sheath to provide the appropriate buoyancy at each point along the streamer.

A serious problem arises when the terminating pins, or contacts, disposed in the connectors at either end of a section of the streamer are short-circuited by a conductive buoyancy balancing fluid leaking from the sheath. The contacts may also be exposed to corrosive salt water from the leaking sheath if it is punctured or otherwise damaged. This problem has been addressed in the past by applying a suitable potting compound to the backside of the connector. However, the potting compound is often ineffective at preventing the ingress of salt water and interferes with the repair and/or replacement of the contacts in the coupler.

U.S. Pat. No. 5,510,577 to Corrigan, incorporated by reference into the present application, discloses a multiple wire connector assembly for a marine streamer which addresses these problems by providing a sealing disk disposed between a connector insert and a compression disk. The compression disk is spring-loaded so as to force the sealing disk against the connector insert which then compresses conical nipples in the sealing disk against each of the individual conductor wires. However, leakage can still occur since the wires may bend near their entrance to the sealing disk. Furthermore, since all of the contacts in the connector are electrical contacts, a different connector must be used when fiber optic contacts, or other types of terminals, are required.

SUMMARY OF THE INVENTION

The invention disclosed below addresses these and other drawbacks associated with conventional technology by providing a hybrid marine connector having an insert assembly including a front insulator disk, a rear insulator disk arranged coaxial with the front insulator disk and having a front surface secured to a rear surface of the front insulator disk. A plurality of holes extend through the front and rear insulator disks substantially parallel to a longitudinal axis of the disks. A contact is secured in each of the holes with one end of each contact extending past the front face of the front insulator disk. At least one, preferably O-ring gasket is arranged on each contact for sealing the contact against the inside of the hole in one of the disks. A bolt is also arranged near the central longitudinal axis of the front and rear disks for axially compressing the front insulator disk into abutment with the rear insulator disk.

The invention may also include a collet clip secured in each hole in the front and rear insulator disks with at least one inwardly extending tang or tab for abutting against, and securing, the contact in the hole. Two shoulders may be formed in each of the holes, with one shoulder being formed in each of the disks so that the collet clips may be secured between the shoulders in each hole. Flanges on the contacts may also be secured between the shoulders without using collet clips. The invention may also include an adapter sleeve retained in at least one of the collet clips for adapting the collet clip to secure one of the contacts, such as a fiber optic contact, in the hole.

The invention may be used with a gender changer including an anterior insulator disk, a posterior insulator disk having a front surface abutting a rear surface of the anterior insulator disk, and a plurality of passageways extending through the anterior and posterior insulator disks, where each of the passageways corresponds to a hole through the front and rear insulator disks. A receptacle sleeve is positioned in each passageway for releasably receiving a free end of a contact which is positioned in a corresponding collet clip.

Annular shoulders may be formed in the anterior and posterior insulator disks inside each passageway and the receptacle sleeves positioned between annular shoulders in each disk. For example, the receptacle sleeves may include a central flange for abutting against the shoulders in the passageways. Alternatively, the ends of the receptacle sleeves may abut the shoulders in the passageways. Another bolt is then arranged near the longitudinal axis of the front and rear disks for axially compressing the anterior insulator disk into abutment with the posterior insulator disk.

Finally, the invention also relates to a method of making such an assembly by performing the steps of inserting the collet clips in the holes against a shoulder in one of the front and rear insulator disks, positioning the holes in the other of the front and rear insulator disks over the free ends of the inserted collet clips, axially compressing the front and rear insulator plates by tightening the bolt, and inserting a contact in each of the collet clips with the O-ring on the contact sealing against the wall of the holes in front of the collet clip. The free end of the clipped contacts may then be inserted into the gender charger for coupling to another male connector on another section of the streamer.

BRIEF DESCRIPTION OF THE SEVERAL VIEWS OF THE DRAWINGS

The invention will now be described with respect to the attached drawings in which various structures have been identified with the same numerals throughout each of the figures, and FIGS. 1a, 1b, and 1c are rear, side, and front elevational views of an insert assembly for use with a hybrid submarine streamer connector;

FIG. 3 is an exploded isometric sectional view of the insert shown in FIG. 1;

FIG. 4a is a front elevational view of a gender changer for use with the insert assembly shown in FIG. 1, and FIG. 4b is a side partial sectional view taken along section line IV—IV in FIG. 4a;

DETAILED DESCRIPTION OF THE PREFERRED EMBODIMENTS

Figure 2:
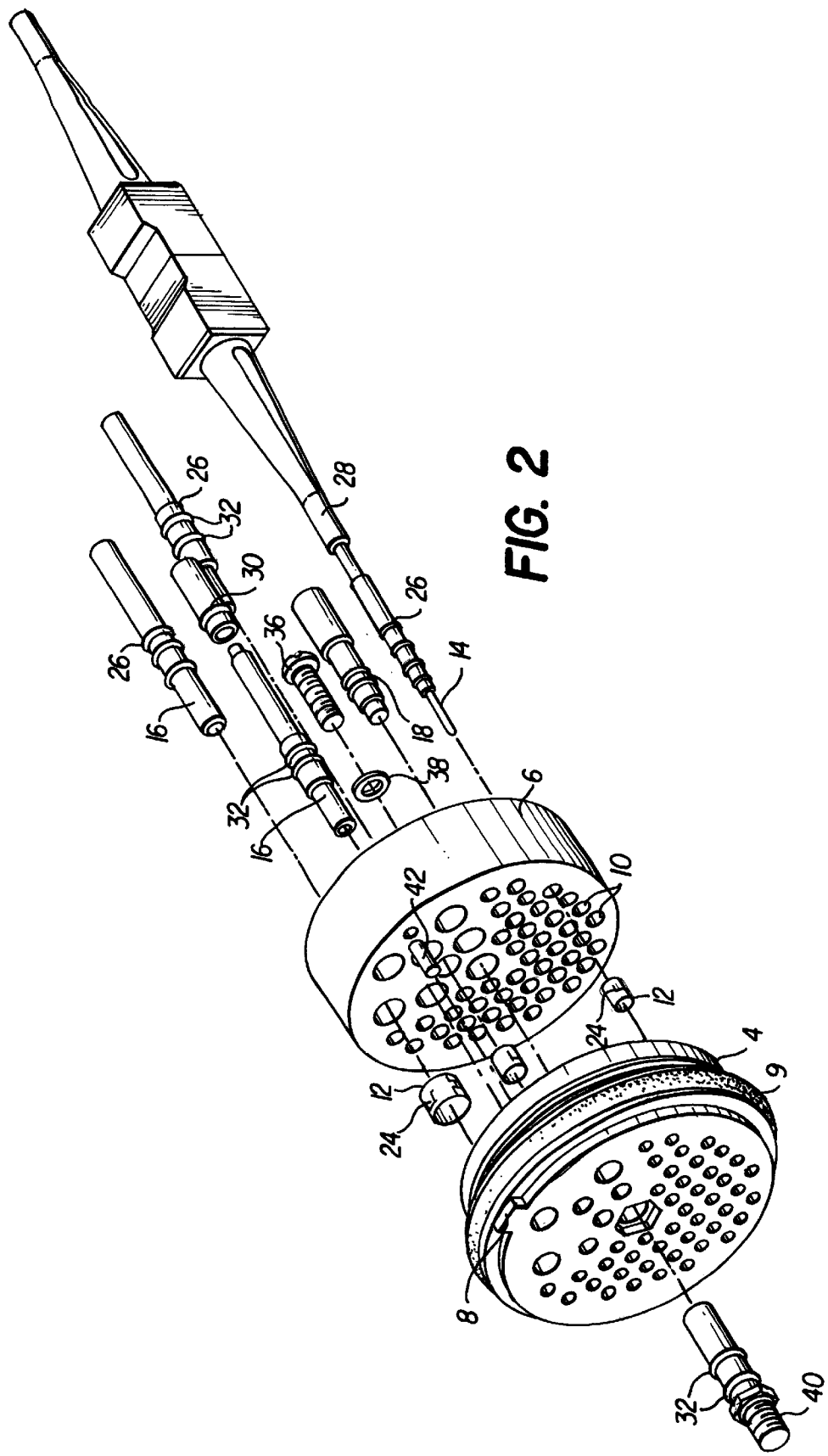
FIGS. 2 is an exploded isometric assembly view of the insert assembly shown in FIG. 1.

FIGS. 1–3 illustrate an insert assembly 2 for use with a hybrid submarine streamer connector which includes contacts for electrical, fiber optic, and/or other types of signal transmission. The insert assembly 2 includes a front disk 4 and a rear disk 6 which are preferably formed from a rigid, electrically insulating material such as plastic or rubber. However, non-insulating materials may be used for insulated contacts or non-electrical signal transmission lines, such as optical fibers.

Once assembled, the disks are coaxially aligned along their longitudinal axes so that the rear face of the front disk 4 abuts the front face of the rear disk 6. The disks 4, 6 are illustrated in the figures as having a circular perimeter with a rectangular alignment tab 8 on the front disk 4 for mating with a corresponding slot in a cylindrical housing (not shown), such as one similar to the coupler housing shown in U.S. Pat. No. 5,510,577 to Corrigan, as is known in the art. However, various other shapes and housings may also be used. An O-ring gasket 9 or other seal is seated in circumferential groove 9' on the front disk 4 for creating a fluid-tight seal between the insert assembly 2 and the inside of the housing (not shown). Additional gaskets, or other seals, may also be used around the perimeter, or at the interface, of the front and rear disks 4, 6.

Numerous holes 10 extend through the front and rear disks 4, 6 with the central axes of the holes arranged substantially parallel to the longitudinal axis of the disks. The smaller holes 10 are provided for receiving the electrical contacts 14 while the larger holes receive the fiber optic contacts 16 and plugs 18. However the holes 10 may all be the same (preferably larger) size and the plugs 18 may also be sized to fit in the smaller holes. If the holes 10 are the same size, then they are preferably labeled so that the positions of contacts in each connector may be easily matched. However, other hole configurations and positions may also be used.

Each of the holes 10, except for the center hole, is fitted with a collet clip 12 for releasably retaining a corresponding electrical contact 14, fiber optic contact 16, or plug 18 as described in more detail below. For convenience, the term "contact" will be used here to include electrical contacts, fiber optic contacts, plugs, and other types of terminals which may be inserted into the holes 10 of an insert assembly for a submarine streamer connector. The collet clips 12 are preferably made from brass, or other corrosion resistant material, and have a generally cylindrical shape corresponding to the inside diameter of the holes 10. However, other shapes and materials may also be used.

As shown in FIG. 3, the collet clips 12 are preferably positioned between a shoulder 22 formed in the front of rear insulating disk 6 and shoulder 22' formed in the rear of front insulating disk 4 inside each of the holes 10. At least one of the shoulders 22, 22' are preferably in the form of an annular ledge created by a change in diameter of the holes 10. The other shoulder may be in the form of another annular shoulder formed inside the hole 10 in the other disk. Alternatively, the other end of the collet clip 12 may simply abut the face of one of the disks so that the shoulder 22" is formed by the face of the disk. However, other shoulder configurations may also be used. The shoulders 22, 22' and 22" preferably abut, or nearly abut, the ends of the collet clips 12 when the faces of the front and rear disks 4, 6 are positioned against one another.

This configuration allows for easy assembly of a collet clip 12 into the insert assembly 2 in the following manner. First, the collet clips 12 are partially secured by friction into the appropriate holes 10 on one side of one of the disks. The free ends of the collet clips 12 are then aligned with the corresponding holes 10 on the other disk. Once the disks 4, 6 are fitted onto each end of the collet clips 12, the disks can be compressed together in order to seat the edges of the collet clips against, or nearly against, the shoulders 22, 22' or 22" of each disk. The collet clips 12 may also be secured inside the holes 10 and/or against the faces of the disks 4, 6 by other means such as a suitable adhesive or adhesive sealant.

The collet clips 12 have inwardly directed, resilient tabs, prongs, or tangs 24 which move outwardly when a contact is pushed through the collet clip from the rear. The tangs 24 then snap into place against a shoulder or flange 26 on the contacts 14, 16, and 18. The tangs 24 thereby prevent the contacts 14, 16, and 18 from sliding out of the rear side of the insert assembly 2 in the orientation shown in the Figures. However, the collet clips 12 may be reversed so that the tangs open toward the rear of insert assembly 2. The collet clips 12 may also be replaced by a similarly functioning feature which is integrally formed with one, or both, of the disks 4, 6. For example, the tangs 24 may be molded and/or machined integral with the disks 4, 6. For contacts without flanges, such as certain fiber optic contacts, an adapter sleeve 30 having a flange 26 may be fitted over the contact.

The contacts 14, 16, and 18 and any sleeves 30 may be inserted into, and removed from, the collet clips 12 using a suitable tool, such as the tool 28, as is known in the art. For example, volume one, pages eight through eleven, of "The Encyclopedia of Connectors" by Edwards Publishing Company of Santa Monica, Calif. illustrates front release and rear release contact insertion techniques. Other insertion techniques may also be used. Each collet clip 12 may also be provided with multiple tangs 24 that extend inward in opposite axial directions. In an alternative embodiment, the contacts 14–18 may be secured in the holes 10 without collet clips 12 such as by positioning the flanges 26 on the contacts between the shoulders 22, 22', and/or 22".

Each of the contacts 14, 16, and 18 is provided with one or more gaskets for sealing the contact against the inside of the hole 10. These gaskets prevent infiltration of buoyancy balancing fluids, sea water, or other fluids from the rear of the assembly 2 through the holes 10. Placing the gaskets on the contacts 14–18 inside the holes 10 helps isolate the seals from movement in the wires that are connected to the rear ends of the contacts and also offers greater pressure resistance, which expected to be as high as 3300 feet of hydraulic head. It also allows the gaskets to be easily installed or replaced at the same time as the contacts 14, 16, and 18.

The gaskets are preferably in the form of two O-rings 32 arranged on each contact 14, 16, and 18 on one side of the flange 26. The O-rings 32 may also be placed inside the holes 10 before the contacts 14, 16, and 18 fitted into the holes. A different type and/or number of seals may also be used. The O-ring gaskets 32 may also be positioned on each side, or on the opposite side, of the flanges 26. However, in these latter configurations, care must be taken that the tool 28 does not damage the O-rings 32 during insertion of the contacts 14, 16, and 18.

When the appropriate contacts 14, 16, and 18 are fully inserted into the collet clips 12, the O-rings 32 are preferably arranged in corresponding seating cavities 34 inside the contact holes 10 in the front insulator disk 4. The cavities 34 provide a sealing surface or shoulder against which the O-ring gaskets 32 are urged by the resilient tangs 24 against the flange 26 on the contacts 14, 16, and 18. Similar seating cavities may also be provided on the surface of the contacts 14, 16, and 18. Alternatively, the O-rings 32 or other seals may simply seat against the surface of the contacts 14, 16, and 18 and the walls of the corresponding contact hole 10 without use of the seating cavities 34. When the insert assembly 2 is used without collets 12, gaskets may be provided on the faces of the contact flanges 26.

In another embodiment (not shown), the front disk 4 may be composed of two layers which are molded or otherwise bonded together. A hard thermoplastic material is arranged on the front side of the front disk 4 in order to ensure dimensional stability and accuracy of the holes with respect to the contact positions. A resilient, preferably rubberized layer, is then molded onto, or adhered to, the harder front layer. The resilient rear layer replaces at least one of the O-rings 32 on each contact 14, 16, and 18 by sealing against the contact with, or without, compression of the front and rear disks 4, 6. For example, the rubberized layer may have circular cavities with ribbed protrusions that interconnect with corresponding circumferential recesses in the contacts 14, 16, and 18. In this way there is only one sealing layer between the front and rear disks 4, 6 and one or both of the multiple O-rings on each of the contacts 14, 16, and 18 may be eliminated.

Once the collet clips 12 are partially fitted into the holes 10 in one of the disks, and the holes on the other disk are aligned with the exposed portion of the collet clips, then the disks may be axially compressed together using a fastener, such as a bolt 36 with washer 38 that is threaded into a bushing 40 through one of the holes 10 (without a collet clip 12), preferably near the central longitudinal axis of the disks 4, 6. The bolt 36 is preferably provided with O-ring gaskets 32 and corresponding seating cavities. Other means for compressing and/or securing the front insulator disk to the rear insulator disk may also be used including as latches, springs, snaps, adhesives, and/or adhesive seals.

The bushing 40 may also be replaced with threads formed on the inside of one of the holes 10. For example, threads could be molded integral with the front disk 4, thus potentially eliminating the need for gaskets on the fastener 36. Such threads could be post-threaded (after molding using standard mechanical threading processes) or molded as is, using a threading mold die (unscrewing). In order for the integrally-molded threads to meet the harsh conditions normally expected during field use, they are preferably formed in a robust material which may also form the remainder of the disk in which the threads are located.

Besides holding the front and rear disks 4, 6 together with the collets 12 between them, the bolt 36 helps keep the holes 10 and collets 12 in proper alignment as the disks 4, 6 are brought together. The insert assembly 2 may be further provided with a dowel or pin 42 which extends between the rear of the front insulator disk and the front of the rear insulator disk 6 for preventing the disks from rotating relative to each other during assembly since such rotation could otherwise stress the collet clips 12 or contacts 14, 16, and 18. The bolt 36 and bushing 30 are also easy to assemble and disassemble when installing or replacing collets 12 and contacts 14, 16, and 18 in the insert assembly 2.

Figure 5:
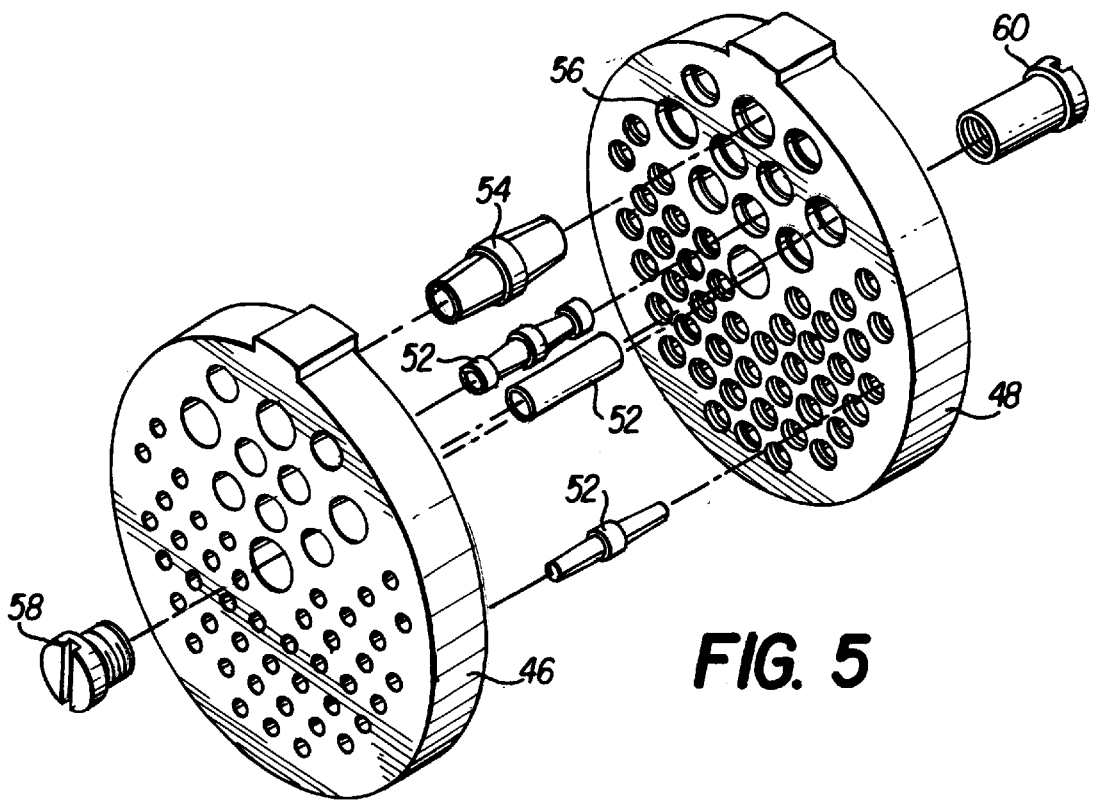
FIG. 5 is an exploded isometric assembly view of the gender changer shown in FIG. 4.
Figure 6:
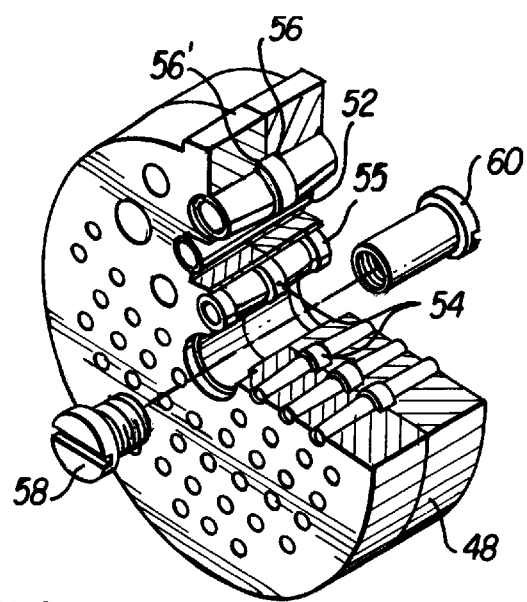
FIG. 6 is a isometric partial sectional view of the gender changer shown in FIG. 5.

Referring now to FIGS. 4 through 6, the insert assembly may be used with the illustrated gender changer 44. The gender changer includes an anterior disk 46 and a posterior disk 48 with a front surface that abuts a rear surface of the anterior insulator disk. Numerous passageways 50 extend through the disks 46, 48 substantially parallel to the longitudinal axes of the disks. Each of the passageways is fitted with a receptacle sleeve 52 for receiving free ends of two contacts 14, 16, and 18 extending from corresponding insert assemblies 2 (not shown in FIGS. 3–6) on opposite sides of the gender changer. The gender changer 44 is therefore arranged between the front faces of the front disks 4 on two separate connectors.

The receptacle sleeves 52 may include annular flanges 54 and/or end flanges 55 which are positioned between shoulders 56, 56' formed in each of the passageways 50 in the anterior and posterior disks 46, 48. Collet clips or other suitable means may also be used to secure the receptacle sleeves 52 inside the passageways 50. The receptacle sleeves 52 are secured between the shoulders 56, 56' in the anterior disk 46 and the posterior disk 48 using another using a bolt 58 and threaded bushing 60 preferably arranged the central longitudinal axis of the disks. The bolt 58 may be replaced with an extension of the bolt 36 in the front and rear disks 4, 6.

The gender changer allows male contacts to be used on each end of a streamer section. The male contacts are generally more robust, easier to clean, and simpler to inspect and maintain than female contacts. When the receptacle sleeves 52 in the gender changer 44 become dirty or damaged, they are easily replaced by unscrewing the bolt 58 and bushing 60. Alternatively, since the gender changers 44 are much less expensive to produce that a new connector, new or refurbished gender changers can be used each time a streamer is assembled.

Although the invention has been described above with respect to various embodiments, it will be readily understood to one of ordinary skill in the art that various changes and/or modifications may be made without departing from the spirit of the invention. It is therefore intended that the scope of protection for the invention be limited only to the following claims.

What is claimed is:

1. An insert assembly for a hybrid marine connector, comprising:
    a front disk;
    a rear disk abutting the front disk;
    a hole extending through the front and rear disks, the hole having shoulders on each of the disks;
    a collet clip positioned between the shoulders in the hole for releasably retaining a contact in the hole;
    means for axially compressing the front disk into abutment with the rear disk; and
    a gender changer including:
        an anterior disk;
        a posterior disk abutting the anterior disk;
        a passageway extending through the anterior and posterior disks in the position corresponding to the hole through the front and rear disks; said passageway having annular shoulders formed in the anterior and posterior disks; and
        a receptacle sleeve for receiving a free end of a contact positioned in the hole, said receptacle sleeve having a central flange for abutting against the annular shoulders in the passageway to position the receptacle sleeve in the passageway.

2. The insert assembly recited in claim 1 wherein said axial compressing means includes a bolt extending through the front and rear disks substantially parallel to the longitudinal axis of the hole.

3. The insert assembly recited in claim 1 further comprising at least one groove in the wall of the hole for sealing against a gasket arranged on a corresponding contact.

4. The insert assembly recited in claim 1, further comprising another bolt arranged near a longitudinal axis of the anterior and posterior disks for axially compressing the anterior disk into abutment with the posterior disk.

5. The insert assembly recited in claim 1 further comprising an adapter sleeve retainable in said hole by said collet clip for adapting the collet clip to retain the contact.

6. The insert assembly recited in claim 5 wherein said adapter sleeve includes a flange for abutting a portion of the collet clip.

7. The insert assembly recited in claim 1 further including a tool which enables the contacts to be inserted and removed from the collet clip.

8. An insert assembly for a hybrid marine connector, comprising:
    a front insulator disk;
    a rear insulator disk arranged coaxial with the front insulator disk and having a front surface secured to a rear surface of the front insulator disk;
    a plurality of holes extending through the front and rear insulator disks substantially parallel to a longitudinal axis of the disks, each hole having two shoulders formed therein, with one shoulder being recessed in said front disk and the other being recessed in said rear disk;
    a contact secured in each of the holes with one end of each contact extending past the front face of the front insulator disk;
    at least one gasket arranged on each contact for sealing the contact against the inside wall of the hole in one of the disks;
    a fastener arranged near the central longitudinal axis of the front and rear disks for axially compressing the front insulator disk into abutment with the rear insulator disk; and
    collet clip secured in each hole and abutting the shoulders formed on the front and rear disks, with at least one inwardly extending tine for abutting and securing the contact in the hole.

9. The insert assembly recited in claim 8 further comprising an adapter sleeve retained in at least one of said collet clips for adapting the collet clip to secure one of the contacts in the hole.

10. The insert assembly recited in claim 9 wherein said one contact is a fiber optic contact.

11. The insert assembly recited in claim 10 further comprising a gender changer including:
    an anterior insulator disk;
    a posterior insulator disk having a front surface abutting a rear surface of the anterior insulator disk;
    a plurality of passageways extending through the anterior and posterior insulator disks, each of said passageways corresponding to a hole through the front and rear insulator disks;
    a receptacle sleeve positioned in each passageway for releasably receiving a free end of a contact which is positioned in a corresponding collet clip; and
    a fastener arranged near the longitudinal axis of the front and rear disks for axially compressing the front insulator disk into abutment with the rear insulator disk.

12. The insert assembly recited in claim 11 wherein said receptacle sleeves are positioned between annular shoulders formed in the anterior and posterior insulator disks inside each passageway.

13. The insert assembly recited in claim 12 wherein said receptacle sleeves include a central flange for abutting against said shoulders in the passageways.

14. A method of making an insert assembly, comprising:
    a front insulator disk;
    a rear insulator disk arranged coaxial with the front insulator disk and having a front surface secured to a rear surface of the front insulator disk;
    a plurality of holes extending through the front and rear insulator disks substantially parallel to a longitudinal axis of the disks;
    a contact secured in each of the holes with one end of each contact extending past the front face of the front insulator disk wherein at least one of said contacts is a fiber optic contact;
    at least one gasket arranged on each contact for sealing the contact against the inside wall of the hole in one of the disks;
    a fastener arranged near the central longitudinal axis of the front and rear disks for axially compressing the front insulator disk into abutment with the rear insulator disk;
    a collet clip secured in each hole with at least one inwardly extending tang for abutting and securing the contact in the hole;

two shoulders formed in each of the holes, one shoulder being formed in each of the disks, wherein the collet clips are secured between the shoulders in each hole;

an adapter sleeve retained in at least one of said collet clips for adapting the collet clip to secure one of the fiber optic contacts in the hole; and a gender changer including an anterior insulator disk, a posterior insulator disk having a front surface abutting a rear surface of the anterior insulator disk, a plurality of passageways extending through the anterior and posterior insulator disks, each of said passageways corresponding to a hole through the front and rear insulator disks, a receptacle sleeve positioned in each passageway having a central flange for abutting against said shoulder in the passageways, for releasably receiving a free end of a contact which is positioned in a corresponding collet clip, and a fastener arranged near the longitudinal axis of the front and rear disks for axially compressing the front insulator disk into abutment with the rear insulator disk;

said method comprising:

inserting the collet clips in the holes against a shoulder in one of the front and rear insulator disks so that collet clips have a free end;

positioning the holes in the other of the front and rear insulator disks over the free ends of the inserted collet clips;

axially compressing the front and rear insulator plates by tightening the bolt; and inserting a contact in each of the collet clips with the O-ring on the contact against the wall of the holes in front of the collet clip.

15. The method recited in claim 14 further comprising the step of inserting the free end of the clipped contacts into the gender charger.

* * * * *